Figure 1A:
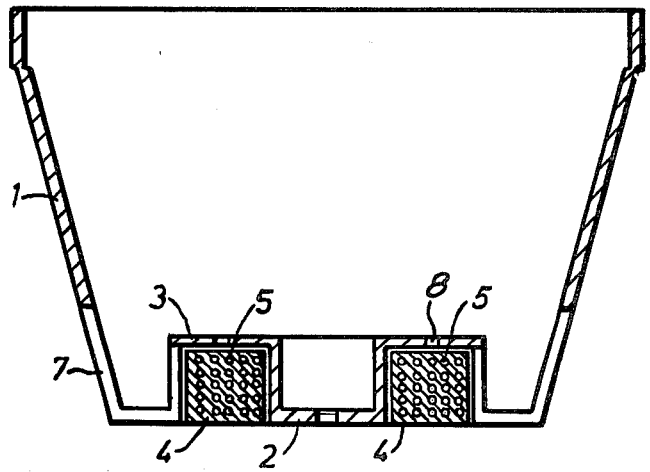

United States Patent [19]

Hentschel et al.

[11] 4,161,844

[45] Jul. 24, 1979

[54] HYDROCULTURE PLANT POT WITH AN INSERTED CONTAINER FOR RECEIVING A HYDROCULTURE FERTILIZER

[75] Inventors: Claus Hentschel; Karl Martin, both of Cologne, Fed. Rep. of Germany; Leonard Volckaert, Merelbeke, Belgium

[73] Assignee: Bayer Aktiengesellschaft, Leverkusen, Fed. Rep. of Germany

[21] Appl. No.: 640,311

[22] Filed: Dec. 12, 1975

[51] Int. Cl.² ............................................. A01G 27/00
[52] U.S. Cl. ...................................................... 47/62
[58] Field of Search ...................... 47/1.2, 34 R, 34 A, 47/34 D, 34 S, 38, 38.1, 48.5, 25, 59–66, 71, 79–81, DIG. 4

[56] References Cited

U.S. PATENT DOCUMENTS

| | | | |
|---|---|---|---|
| 1,633,184 | 6/1927 | Luipersbek | 47/38.1 |
| 1,971,390 | 8/1934 | Van Yahres | 47/48.5 |
| 2,028,255 | 1/1936 | Steinbach | 47/34 R |
| 2,135,998 | 11/1938 | Beyer | 47/38.1 |
| 2,713,752 | 7/1955 | Sobol | 47/38.1 |
| 3,304,653 | 2/1967 | Zadarnowski | 47/48.5 |
| 3,769,748 | 11/1973 | Goldring | 47/48.5 |
| 3,987,584 | 10/1976 | Yellin | 47/34 R |

FOREIGN PATENT DOCUMENTS

| | | | |
|---|---|---|---|
| 245312 | 2/1966 | Austria | 47/1.2 |
| 599030 | 10/1959 | Italy | 47/34.3 |
| 45-28526 | 12/1964 | Japan | 47/62 |
| 1270450 | 4/1972 | United Kingdom | 47/38 |

Primary Examiner—Edgar S. Burr
Assistant Examiner—James R. Feyrer
Attorney, Agent, or Firm—Burgess, Dinklage & Sprung

[57] ABSTRACT

A plant pot for hydrocultures comprising an annular central compartment in the bottom and a container for fertilizer arranged in said compartment.

2 Claims, 3 Drawing Figures

HYDROCULTURE PLANT POT WITH AN INSERTED CONTAINER FOR RECEIVING A HYDROCULTURE FERTILIZER

This invention relates to a plant pot with an inserted container for receiving a hydroculture fertilizer.

Plants raised in hydrocultures have their roots anchored in clay granulate or a plastics material. This supports the roots but does not provide them with nutrient. The nutrients may be supplied to the plants by means of ion exchange fertilizers. The nutrients are dissolved in water and absorbed by the plants. The water surrounds the lower part of the hydroculture plant pot and enters the pot through apertures. If an ion exchange fertilizer is used for supplying the nutrient, the fertilizer is normally provided in the form of small pellets having a diameter of about 0.5 to 1 mm. It has hitherto been the practice to place these fertilizers on the filling material, clay granulate or the like, and wash them into the interior of the hydroculture plant pot with water. However, the pellets of ion exchange fertilizer are thereby very easily washed out of the hydroculture plant pot and collect in the vessel underneath, which serves as water reservoir. Although this does not impair the efficiency of the fertilizer, some of the fertilizer is lost when the lower vessel is cleaned.

It is also known to place or insert containers for ion exchange fertilizer into the lower vessel of the hydroculture plant pot. Since the water level in this vessel may fall very low, the risk of soiling in these containers is great. Particles of dust are liable to settle in the very narrow apertures and obstruct the free access of water to the fertilizer pellets. The supply of nutrients to the plant may thereby be impaired.

It is an object of this invention to provide a device which will ensure supply of fertilizer to the plant over a prolonged period, for example about one year, and in which the ion exchange fertilizer does not come into direct contact with the surrounding atmosphere.

According to the invention there is provided a hydroculture plant pot with an inserted container for receiving a hydroculture fertilizer, said plant pot comprising an annular central compartment in the bottom, the container being arranged in said compartment and being provided with apertures and/or slots, the diameter of the apertures and/or the width of the slots being less than the size of the particles of the hydroculture fertilizer.

Preferably the compartment in the bottom has a depth of about 0.5 to 2.5 cm, an internal diameter of about 6 to 10 cm; the diameter of the apertures and/or slots is about less than or equal to 0.5 cm.

One particular advantage achieved with the invention is that sufficient fertilizer to supply a plant for about one year can be introduced into the container for the hydroculture fertilizer. This container is inserted into the annular compartment in the bottom of the hydroculture plant pot so that it cannot be seen from outside. The plant pot thus protects it against dirt. Since the container is arranged at the lowest point of the hydroculture plant pot, it will always be surrounded by water so that the supply of nutrient to the plant is ensured. No fertilizer is lost when the hydroculture plant pot and its water reservoir are cleaned.

Another advantage of the invention is that a container with a fresh supply of hydroculture fertilizer can be inserted at any time without repotting the plant. This provides a considerable saving in time, especially in nurseries.

Another advantage of providing the annular compartment in the bottom of the hydroculture plant pot is that the plant pot itself can still be fixed in studs on the lower vessel.

An example of the device according to the invention is illustrated in the drawings and described in more detail below.

Figure 2:
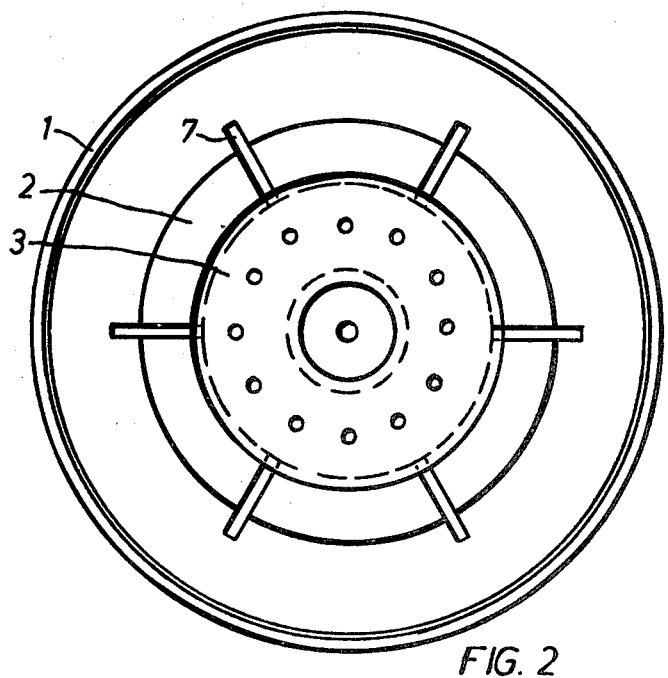
Figure 1B:
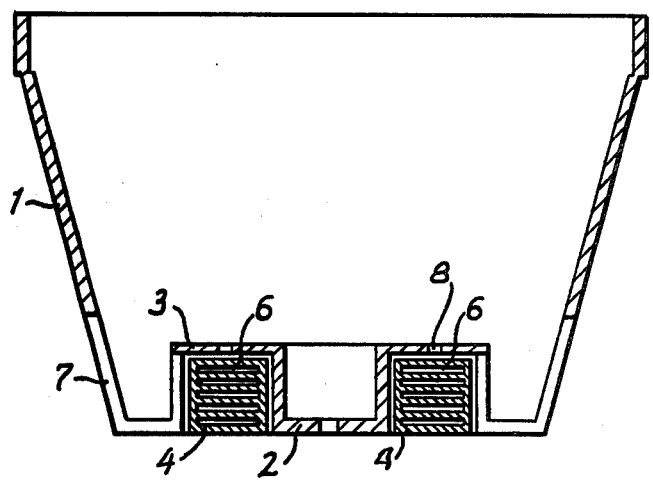

FIGS. 1A and 1B are sections of two different embodiments of the plant pot according to the invention and FIG. 2 is a top plan view of the plant pot according to the embodiment shown in FIG. 1.

The hydroculture plant pot 1 is used to hold plants. It is placed in a water reservoir. Water flows from a surrounding reservoir (not shown) into the plant pot 1 through slots 7. Water can flow between the compartment 3 and the interior of the plant pot 1 by means of holes 8. The bottom 2 of the hydroculture plant pot 1 has an annular compartment 3. A container 4 for hydroculture fertilizer is inserted in this compartment 3. Apertures 5 and/or slots 6 are arranged in the container 4 to enable the fertilizer to enter the water and be conveyed to the plants. These apertures are smaller than the diameter of the pellets of hydroculture fertilizer. If ion exchange fertilizers are used, the apertures have a diameter of about 0.5 mm and the width of the slots is also about 0.5 mm. Conical sleeves may be arranged on the top surface of the compartment 3 in the bottom of the hydroculture pot 1 for the insertion of supporting sticks for tying down creepers or similar plants.

What is claimed is:

1. A hydroculture plant pot with an inserted container for receiving a hydroculture ion exchange fertilizer, means for insuring that said container will always be surrounded by water as long as any water remains in said plant pot, including an annular compartment projecting from the bottom of said plant pot and surrounding a portion of said bottom, said annular portion being surrounded by an additional portion of said bottom, means to enable water passage between said compartment and the remainder of said plant pot, said container being positioned in said compartment and being provided with apertures to permit the passage of water, the dimensions of said apertures being less than the size of the particles of the hydroculture fertilizer.

2. A hydroculture plant pot as claimed in 1, said compartment having a depth of about 0.5 to 2.5 cm and an internal diameter of about 6 to 10 cm, the size of the apertures being no more than 0.5 cm.

* * * * *